Figure 16:
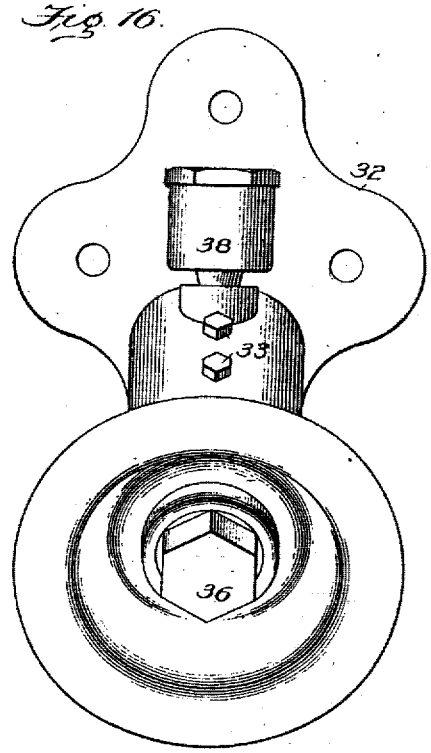

No. 826,312. PATENTED JULY 17, 1906.
R. M. CATLIN.
BELT CONVEYER.
APPLICATION FILED APR. 12, 1904.
6 SHEETS—SHEET 1.
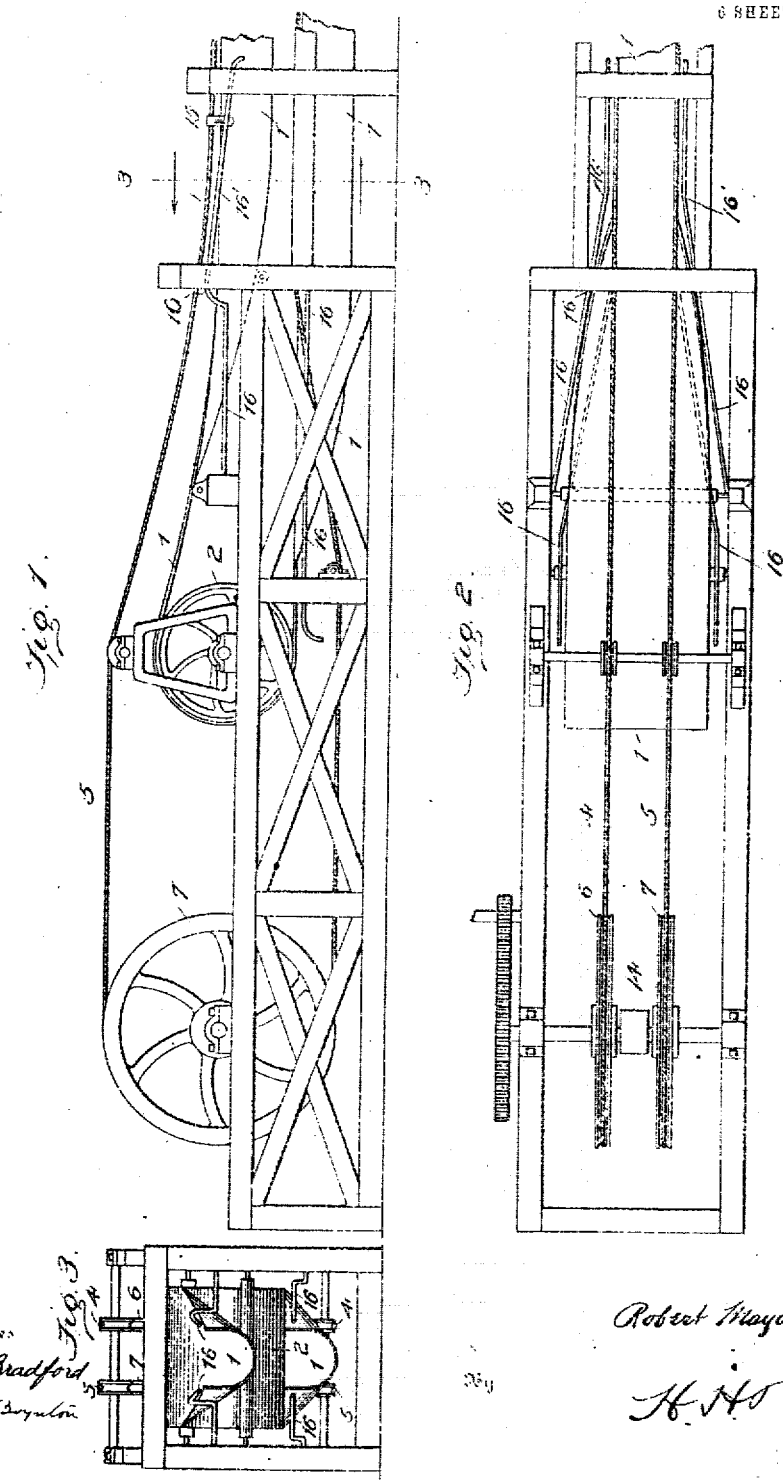
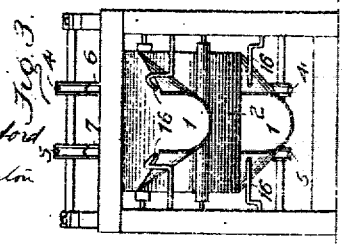
Witnesses
Edwin L. Bradford
Lewis T. Boynton
Inventor
Robert Mayo Catlin
By H. H. Bliss
Attorney No. 826,312. PATENTED JULY 17, 1906.
R. M. CATLIN.
BELT CONVEYER.
APPLICATION FILED APR. 12, 1904.
6 SHEETS—SHEET 2.
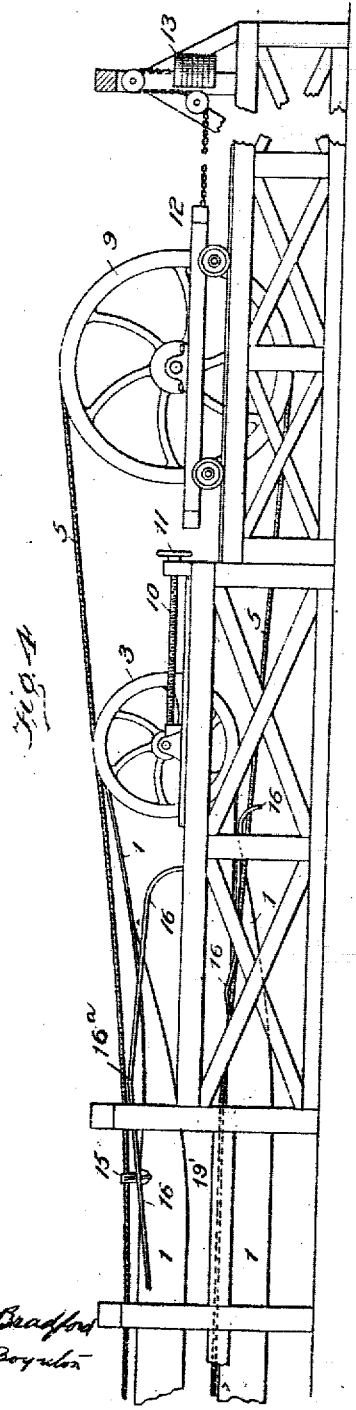
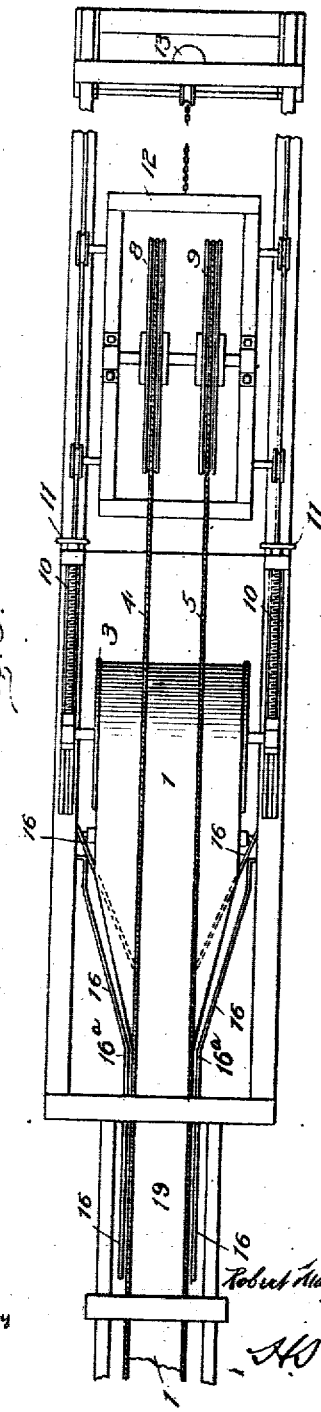

No. 826,312. PATENTED JULY 17, 1906.
R. M. CATLIN.
BELT CONVEYER.
APPLICATION FILED APR. 12, 1904.
6 SHEETS—SHEET 3.
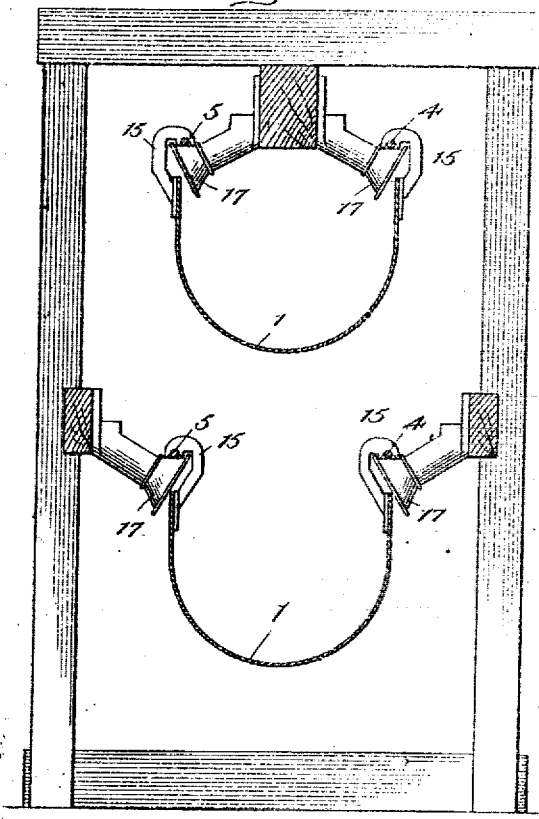
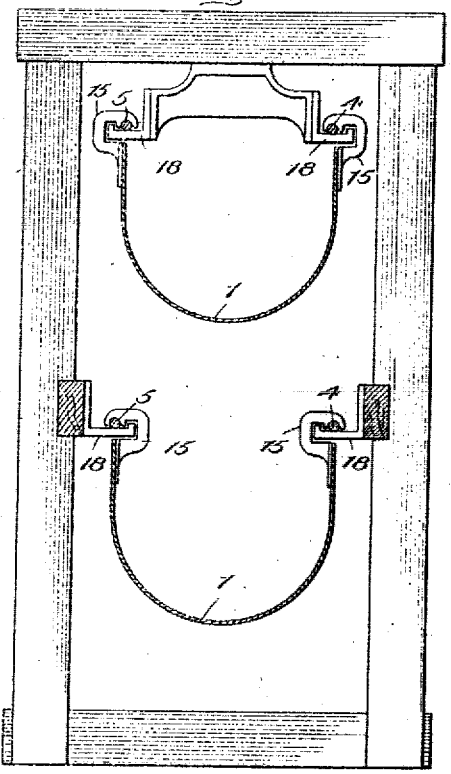
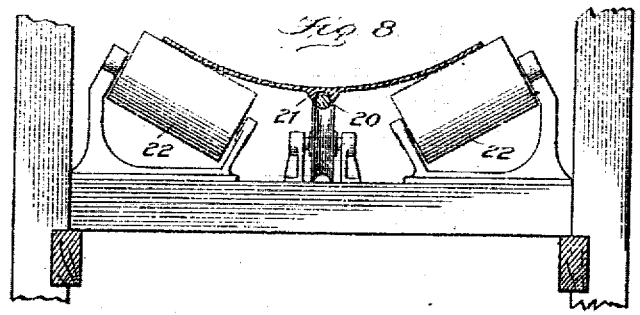
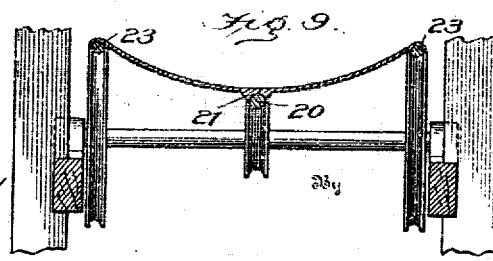
Witnesses
Edwin L. Bradford
Lewis C. Boynton
Inventor
Robert Mayo Catlin
By H. H. Bliss
Attorney

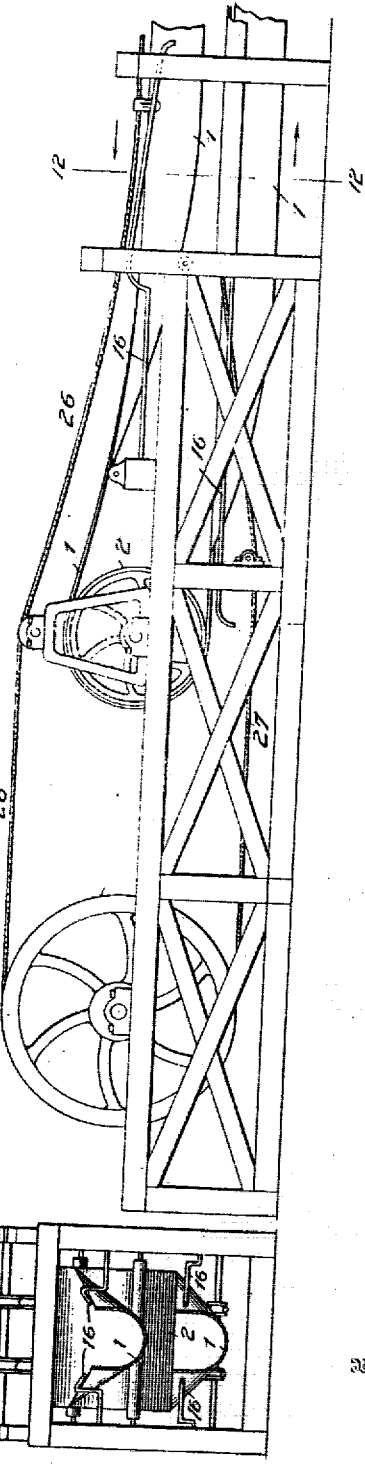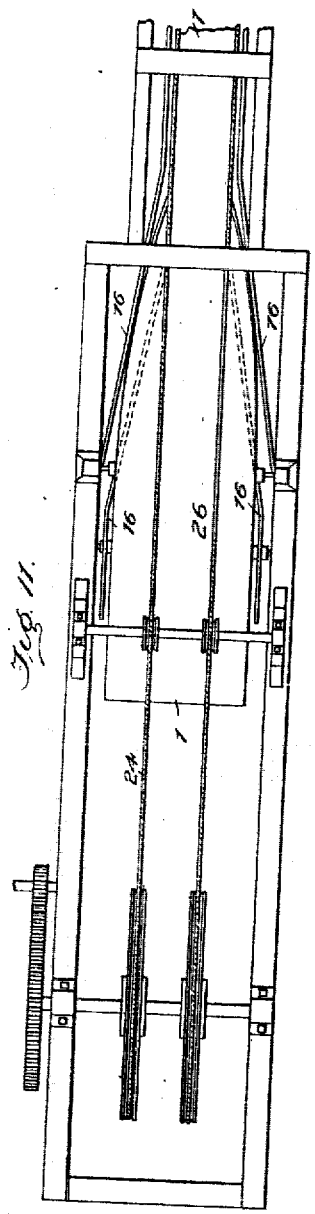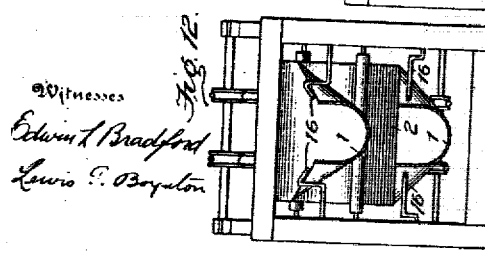

No. 826,312. PATENTED JULY 17, 1906.
R. M. CATLIN.
BELT CONVEYER.
APPLICATION FILED APR. 12, 1904.
6 SHEETS—SHEET 5.
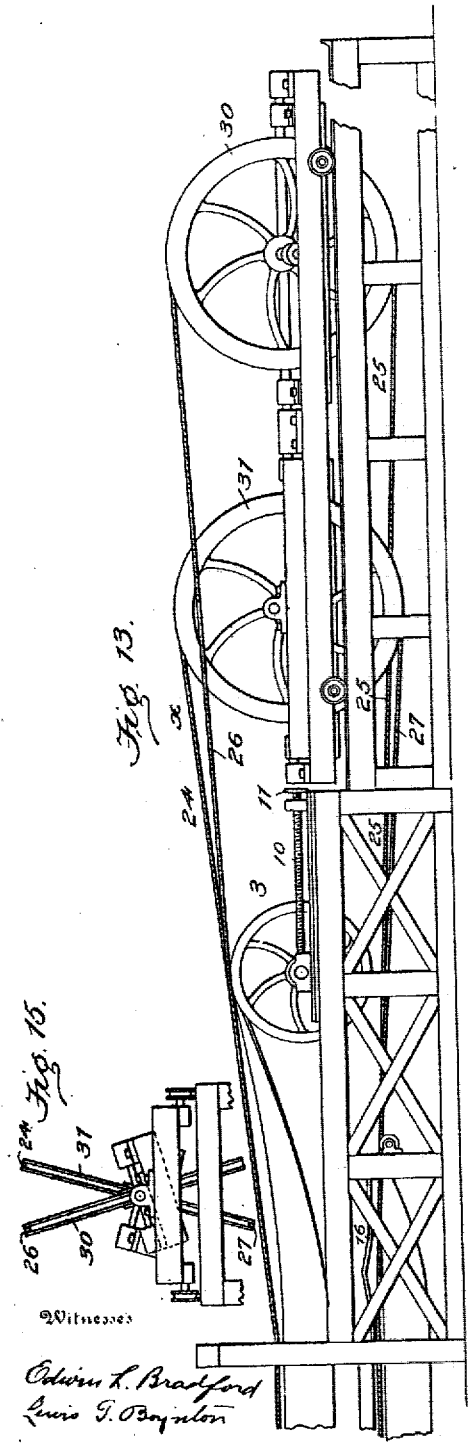
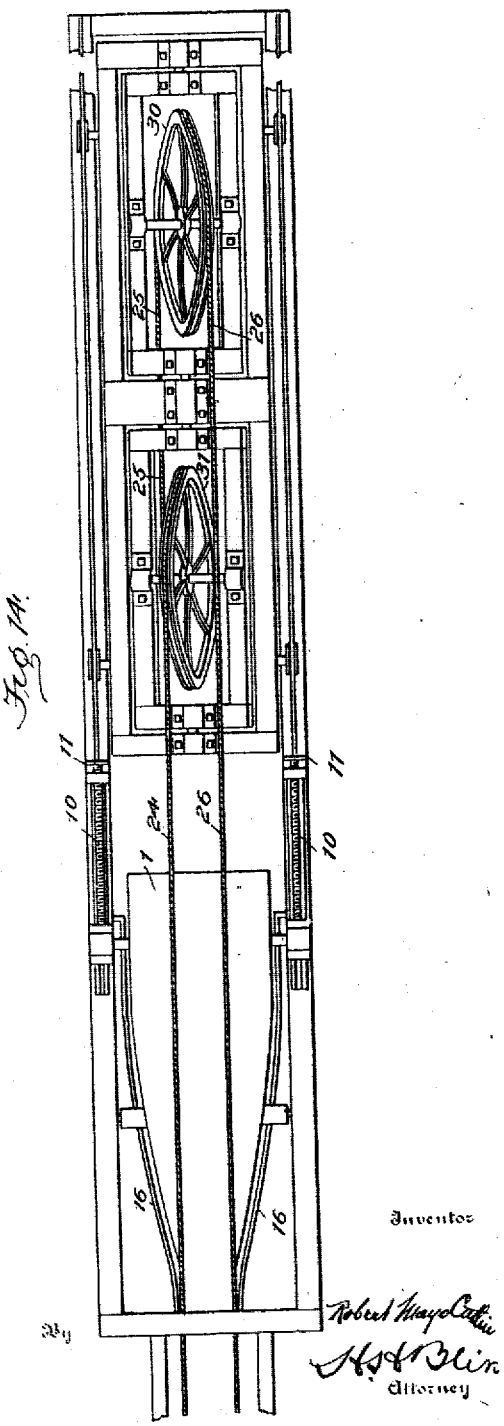

No. 826,312. PATENTED JULY 17, 1906.
R. M. CATLIN.
BELT CONVEYER.
APPLICATION FILED APR. 12, 1904.

6 SHEETS—SHEET 6.

Witnesses
Edwin L Bradford
Lewis S Boynton

Inventor
Robert Mayo Catlin
By H.S.C. Olin
Attorney

UNITED STATES PATENT OFFICE.

ROBERT MAYO CATLIN, OF WITWATERSRAND DISTRICT, TRANSVAAL.

BELT CONVEYER.

No. 826,312.    Specification of Letters Patent.    Patented July 17, 1906.

Application filed April 12, 1904. Serial No. 202,865.

*To all whom it may concern:*

Be it known that I, ROBERT MAYO CATLIN, mining engineer, of the South Rose Deep Gold Mining Company, Limited, Witwatersrand District, in the Colony of the Transvaal, have invented certain new and useful Improvements in Belt Conveyers, of which the following is a specification.

Hitherto belt conveyers have been employed for transporting material only over comparatively short distances and within a restricted range of upward inclination from the horizontal, the limiting-angle of which is theoretically considered to be about twenty-seven degrees, although in actual practice an angle of twenty-two degrees is about the maximum attained. The existing methods of construction while being efficient enough for such limited service become inadequate when applied to conveyers of great length or those which are set at a considerable angle to the horizontal. In the former case, owing to the great length and cost of the belt, its preservation becomes a matter of much moment, while, on the other hand, the influences making for its destruction are greatly augmented. Among the difficulties encountered are the injuriously high stresses produced in the fabric of the belt by reason of the great weight of the material carried and the force which must necessarily be transmitted through it from the driving-drum, the wear of the belt caused by heavy masses of conveyed ore striking through it against the supporting-rollers when these are employed, and the prohibitive cost of such rollers when they are fitted in the large numbers demanded for the proper supporting of a long belt.

The present invention therefore relates to certain improvements in the means of supporting and driving conveyer belts in order to adapt them to such extended use, characterized, primarily, by transferring the stresses of load and motion ordinarily borne by the belt to cables which both support and propel the belt.

A secondary feature of the invention is the bag-like cross-sectional form which the belt assumes when employed in the manner to be indicated, whereby such friction is set up between it and its contained material that the latter is readily conveyed even when the belt is much inclined from the horizontal, thus rendering the apparatus capable of acting as an elevator.

The invention further comprises several novel devices applicable to conveyers of this type.

Speaking generally, then, a conveyer constructed according to these ideas consists of an endless belt supported and driven by one or more endless cables. At each end of the system the belt passes over freely-turning drums, while the cables are laid over separate sheaves, which may also serve to drive them. The cable-sheaves are situated between or beyond the belt-drums, according as the cables are located under or above the belt. The devices employed for attaching the belt to the cable or cables are of such a nature that while serving to securely unite the two, during the time that they are traveling between the terminals of the system, yet upon their arrival at those points said devices, being actuated by suitable apparatus, readily detach the belt from the cables and permit each to run over its proper drum or sheave, as the case may be. When two or more cables are employed, precautions must be taken to insure that they all travel at a uniform speed in order to prevent one side of the belt from being dragged in advance of the other, and thus causing the belt to be jerked and strained.

In order to further elucidate the above general explanation, the following particular description of several practical embodiments of the invention is given.

Figure 17:
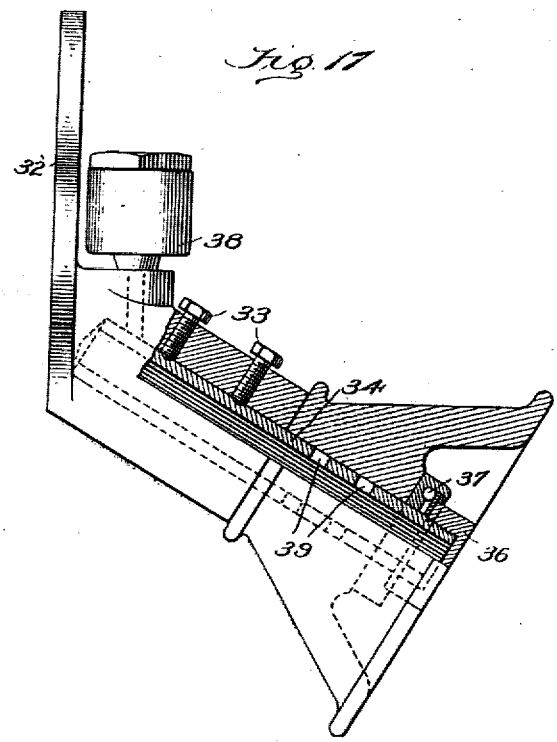
Figure 18:
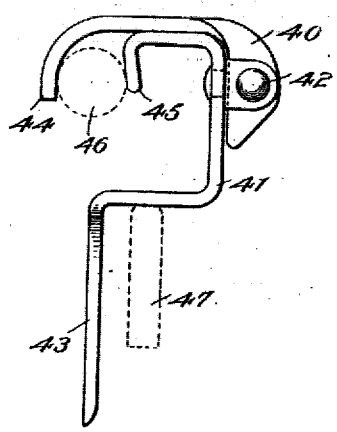
Figure 19:
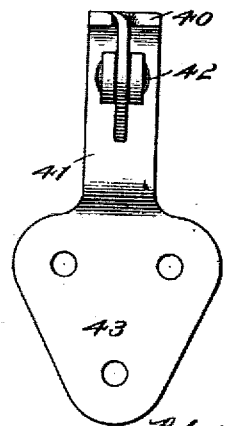

Figure 1 is a side elevation of that portion of a conveyer mechanism which is at or adjacent to the driving-terminal. Fig. 2 is a plan view of the parts shown in Fig. 1. Fig. 3 is an end view. Fig. 4 is a side elevation of the parts at and adjacent to the opposite terminal. Fig. 5 is a plan view of the parts shown in Fig. 4. Fig. 6 is a cross-section showing supporting devices of one of the forms that can be used for supporting the conveyer and the driving device at points intermediate of the terminals. Fig. 7 is a vertical section showing a modified form of these intermediate supporting devices. Fig. 8 is a cross-section of a conveyer of modified form embodying some of my improvements, the driving device in this case being located relatively lower than the conveyer proper. Fig. 9 is a cross-section of still another form of the conveyer. Fig. 10 is a side elevation showing part of a conveyer also embodying my improvements, the driving devices here being of a modified character in comparison with that shown in Figs. 1 to 5 and the parts shown in this figure being at or adjacent to the driving-terminal. Fig. 11 is a plan view. Fig. 12 is an end elevation of the parts shown in Fig. 10. Fig. 13 is a side view. Fig. 14 is a plan view, and Fig. 15 is an end view, of the parts at and adjacent to the terminals of the apparatus, partly shown in Figs. 10 to 12. Fig. 16 is a face view; and Fig. 17 is a view in side elevation, partly in section, showing one of the forms of intermediate supporting devices for the conveyer and driver. Fig. 18 is a side view, and Fig. 19 is a face view, of a modified form of support.

Considering first Figs. 1 to 7, 1 is the endless belt, of india-rubber or other suitable material, passed at the terminals around the drums 2 and 3, while the cables 4 5 are likewise lapped over the driving-sheaves 6 7 and the loose sheaves 8 9. The drum and sheaves at the driving end are mounted in fixed bearings; but those at the tension end have means for shifting them longitudinally in order to permit adjustment of the tensions of the belt and cables, respectively. In the case of the belt-drum such means may conveniently take the form of the two screwed rods 10, fixed to the bearings and operated by the hand-wheels 11, the bearings being confined in suitable guides, while the cable-sheaves are preferably mounted upon a wheeled carriage 12, running on rails and drawn outwardly by the weight 13, connected to it by a pulley-guided chain. Uniformity of motion may be secured by any known means—such, e. g., as interposing a speed-equalizing gear 14 between the two driving-pulleys; but the arrangement hereinafter described is preferred for this purpose. The belt is suspended from the cables by means of a number of suitably-spaced grip hooks or hangers 15, attached to the edges of the belt, of such a nature that when pressed onto a cable they grasp it securely, while readily disengaging from it upon being lifted up. The means adopted for freeing the belt from and reattaching it to the cables at the terminals consists of guides 16, fixed to the framework by the side of the belt, whose shape (clearly indicated in the drawings) is such that as each hanger approaches a drum it meets a guide by which it is detached and lifted from the cable, while a second guide conducts it back again onto the cable after it has passed the drum.

Referring to Figs. 1, 2, and 3, it will be noted that the upper guides 16 are so arranged as to have their innermost ends adjacent to the cupped or troughed edges of the belt at a point beneath the hangers 15, secured to the edges of the belt. The guides then extend upwardly at an inclination to the horizontal and outwardly away from the central vertical longitudinal plane of the belt. The hangers 15 engage the guides and ride along upon them and are forced upwardly by them relatively to the adjacent strand of cable until at 16' they are lifted above and released from the cable. The guides then diverge outwardly, and the belt flattens and passes to the adjacent guide-pulley or drum 2. It passes around the same and is engaged at the beginning of its lower run by the lowermost guides 16, one arranged at either side of the system and each converging inwardly from its outer to its inner ends. These guides serve to assist in cupping or troughing the belt and to direct the hangers thereon into vertical position, in which they are engaged by the adjacent strands of the cable, which at this section of the system are inclined to the horizontal and run up under the hangers and after having engaged them bear off horizontally, as shown.

In Figs. 4 and 5 it will be noted that the lowermost guides 16 have their innermost ends closely adjacent to the edges of the belt in its troughed or cupped condition and that they diverge outwardly from these points in such manner as to be engaged by the then under surface of the belt as it tends to flatten out to pass around the adjacent drum 3. At points adjacent to these lowermost guides the lower runs of the cables slant downwardly and away from the belt in order to pass around their guide-sheaves 8 9. It will thus be seen that the cables will be automatically released at these points from the hangers 15 on the edges of the belt, as the hangers cannot follow the strands of cable downwardly, and the belt will pass freely around the drum. From thence it extends rearwardly along its upper run and is immediately engaged by the uppermost guides 16 at this end of the system. These guides converge inwardly from their outer ends, so as to engage the edges of the belt to assist in cupping or troughing it, and they extend upward at an inclination to the horizontal to a point $16^a$ and thence downwardly, as shown. The hangers 15 on the edges of the belt engage the adjacent guides and ride upwardly and inwardly therealong until in vertical operative position above the adjacent strand of cable, this occurring as they pass over the points $16^a$, and then as they start downward along the guides they engage with the cable and pass off of the guides. It will be noted that the upper surface of the belt along its upper run is the lower surface of the belt along the lower run and that the belt-drums at either end of the system and the adjacent guides serve as means for reversing the grippers, so that along the upper run of the belt they are turned inwardly and along the lower run of the belt they are turned outwardly, as indicated in Figs. 6 and 7.

The cables are sustained between the terminals by pairs of pulleys 17, as shown in Fig. 6, or of slippers 18, as in Fig. 7, which may be fixed to specially-built frames, as illustrated, or to any other convenient support. The distance apart of the members of each pair is such that the belt sags down between them into a bag-like cross-sectional form, the purpose and effect of which have been hereinbefore explained.

The manner of operating the conveyer is as follows: The driving-pulleys 6 7 being rotated transmit their motion to the cables, and thus through the hangers to the belt, which travels in the direction indicated by the arrows. Material is fed onto the upper portion 19 of the belt at such points as may be desirable and is conveyed by it to the driving-terminal of the system. There the belt is detached from the cables, flattens out, and passes over the drum 2, whereupon the conveyed material is thrown off from it and discharged into a hopper or the like.

A conveyer of the type shown in Figs. 8 and 9 may be employed for covering long distances, but is not, like the foregoing, suitable for use on severe upward gradients, since the belt in this type cannot conveniently be made to assume the bag-like form. In this case the belt is driven and mainly supported by the central cable 20, to which it is gripped by wedging the cable into the V-shaped groove 21, formed of any suitable material, on the under side of the belt. The usual cupping of the edges of the belt is effected by rollers 22, Fig. 8, as in present conveyers, or preferably by cables 23, Fig. 9, moved at a speed coinciding with that of the central cable 20. The only other substantial differences between this and the suspended type lie in the location of the cable-sheaves—i. e., between the belt-drums—and in the manner of detaching the belt from and reattaching it to the cable, detachment being effected by lifting the sides of the belt, whereby the groove 21 is caused to open and release the cable, while a reversal of the operation again secures the belt to the cable.

Considering now the device illustrated in Figs. 10 to 15, instead of there being, as before, two separate cables whose speeds are equalized by a suitable device interposed between their respective driving-pulleys there is one endless cable arranged in four sections 24 25 26 27 by the sheaves 28 29 at the driving end and the sheaves 30 31 on the tension-carriage. Of the two former one only is driven, the other being loose on the shaft. The two latter are inclined from the vertical oppositely to each other, so that cable fed onto either of them from one side of the system is delivered from it on the other side. Their inclination is such that the two upper and two lower cables running between them and the sheaves at the driving-terminal are respectively parallel. The nature of the motion given to the cable will be readily understood by tracing the path of a point on the latter. Starting, say, from $x$, it travels along section 24, round sheave 28, back along section 25, onto sheave 30 and is delivered upon the opposite side of the system into section 26, whence it passes from under sheave 29 into 27, and so by way of sheave 31 back again to the point $x$ on section 24. Thus the two top sections of the cable travel in one direction and the two lower ones in the opposite direction and all at a uniform speed. Although the ordinary horizontal idler, such as is commonly used in connection with traveling cables, may be employed in carrying out this invention, yet in order that a shorter and less unwieldy hanger may be used than would then be the case the pulley shown in Figs. 6, 16, and 17 has been devised. In this the axis is so inclined as to give sufficient clearance to the hangers attached to the cable, as illustrated in Fig. 6, and the periphery of the pulley is coned in order to bring its carrying-surface on which the cables run into a horizontal position. Such a pulley may conveniently consist of a foot 32 of the shape shown in Figs. 16 and 17, in which is fixed by set-screws 33 a hollow spindle 34, on which the wheel 35 is retained by a nut 36, screwed onto its end. A ball thrust-bearing 37 is preferably interposed between the nut and the wheel. Lubrication is effected by oil flowing from the lubricator 38 into the bore of the spindle and thence through oilways 39 to the outer surface thereof. In a modification the wheel runs on a conical bearing screwed onto the spindle, the angle of the cone being such that the wheel has a substantially horizontal bearing. In this case the retaining-nut 36 and thrust-bearing 37 are not required.

Figs. 18 and 19 exhibit an improved grip hook or hanger for suspending the belt from the cable, particularly adapted for use with the above-described idler-pulley. In practice it is made of two pieces 40 41, of sheet metal, cut, bent, and pressed as shown and hinged together at the back by a pin-joint 42. The lower end 43 of the piece 41 is suitably shaped for fixing it to the edge of the belt. The two ends 44 45 are bent down to form gripping-jaws, the end 44 of which projects down somewhat beyond the end 45, which is inclined, as illustrated. The effect of this construction is that when the hanger is being affixed the jaw 44 first encircles the cable 46, and subsequently the jaw 45, being drawn down by the weight of the belt attached to the end 43, jams the cable between them, while during dehooking, which is occasioned by the hanger meeting and being lifted by an inclined guide 47, the jaw 45 is lifted first, and the grip being thus relaxed the entire hanger readily parts from the cable.

I claim as my invention—

1. In a conveyer, the combination of an endless conveyer-belt sustained by suspension at its edges, and an endless driving device and means for automatically connecting said endless driving device to the edges of the conveyer-belt, substantially as described.

2. In a conveyer, the combination of the endless conveyer-belt adapted to be sustained by suspension at its edges, the endless driving device, and intermediate connecting devices for uniting the aforesaid parts, they being secured to one of them and adapted automatically to connect it with the other, substantially as described.

3. In a conveyer, the combination of the endless conveyer-belt adapted to have the edges of its operative part turned upward relatively to the longitudinal central part, the endless driving device, the intermediate connecting devices at the edges of the belt adapted automatically to connect it to the endless driving device, and supports for the driving device intermediate of the ends of the conveyer, substantially as described.

4. In a conveyer, the combination of the endless conveyer-belt, the endless driving device and the two rows of connecting devices adapted automatically to connect the conveyer-belt to the driving device, those of one row when in action being on a line at a distance from the line of the other row less than the width of the conveyer-belt, substantially as described.

5. In a conveyer, the combination of the endless conveyer-belt, the superposed endless driving device adapted to sustain by suspension more or less of the conveyer-belt, and automatically-actuated connecting means between said conveyer-belt and said driving device, substantially as described.

6. In a conveyer, the combination of the endless conveyer-belt adapted to have the edges of its operative part turned relatively upward, the endless driving device and the two rows of connecting devices adapted automatically to connect the conveyer-belt to the driving device, those of one row, when in action, being on a line at a distance from the line of the other row less than the width of the conveyer-belt, substantially as described.

7. In a conveyer, the combination of an endless power-transmitting device, and an endless carrying-belt having its operative parts arranged to travel approximately parallel to the endless driving device, and intermediate joining devices adapted to automatically connect the conveyer-belt to the endless driving device, substantially as described.

8. In a conveyer, the combination of the endless driving device, the endless conveyer arranged to have its operative part travel approximately parallel to the driving device, uniting devices joined rigidly to the endless conveyer and adapted to be detachably connected to the endless driving device, substantially as set forth.

9. The combination of the endless driving device, the endless conveyer-belt arranged to have its operative parts travel approximately parallel to the endless driving device, the intermediate uniting devices permanently connected to one of the aforesaid parts and detachably connected to the other, and means for causing the said connecting devices to move into and out of engagement with the part with which it detachably engages, substantially as set forth.

10. In a conveyer, the combination of the endless driving device, the endless conveyer-belt arranged to have its operative parts travel approximately parallel to the endless driving device, the intermediate uniting devices comprising arms rigidly connected to the conveyer-belt and adapted to intermittently grip the endless driving device for engagement therewith, and means for moving the uniting devices to and from their positions of engagement with and disengagement from the endless driving device, substantially as described.

11. In a conveyer, the combination of an endless driver having two lines of acting parts traveling in the same direction, a conveyer-belt having its active part arranged to travel approximately parallel to the said active parts of the driving device, and intermediate uniting devices, one for each side of the conveyer-belt, each uniting device being rigidly secured to one of the said elements to wit the conveyer-belt or the driving device and being detachably connected to the other of said elements, substantially as set forth.

12. In a conveyer, the combination of an endless power-transmitting device having terminal supporting devices at one end of the conveyer system, and terminal supporting devices at the other end of the system, an endless carrying-belt, intermediate joining devices adapted automatically to connect the conveyer-belt to the endless driving device, and supports intermediate of said terminal supporting devices for sustaining the conveyer-belt while in engagement with the driving device, substantially as set forth.

13. In a conveyer, the combination of the endless driving device having a terminal support at each end of the conveyer, an endless conveyer-belt, intermediate joining devices connected to the said belt and detachably connected with the driving device, and supports intermediate of the aforesaid terminal supports and engaging directly with the driving device to sustain it and the conveyer-belt, substantially as set forth.

14. In a conveyer, the combination of an endless conveyer-belt adapted to be intermittently bent from a flat form to a trough-like form, and from the latter to the former, an endless driving device, and vertically-arranged connecting bars or arms for intermittingly connecting the belt to the driving device and extending from the operative part of the belt on vertical lines up to the driving device, substantially as set forth.

15. In a conveyer, the combination of an endless conveyer-belt adapted to have a part or parts flat from side to side and at the same time another part bent or curved into a trough-like form, an endless driving device supported in an elevated position relative to the central part, longitudinally, of the conveyer-belt, and connecting devices for detachably joining the conveyer-belt to the said driving device, substantially as set forth.

16. In a conveyer, the combination of an endless conveyer-belt, the terminal supports at the ends of the conveyer, said belt being adapted to assume a trough-like form between the said terminal supports, the endless driving device, and connecting devices for joining the trough-like part of the belt with the endless driving device, the terminal parts of the conveyer-belt being disconnected from the driving device, substantially as set forth.

17. In a conveyer, the combination of an endless conveyer-belt, the rotary terminal supports for the belt, the endless driving device, the rotary terminal supports for the driving device, intermediate supports for the conveyer-belt supplemental to the terminal supports, and means for detachably and positively connecting the conveyer-belt to the driving device, substantially as set forth.

18. In a conveyer, the combination of an endless conveyer-belt, the rotary terminal supports therefor, the endless driving device connected detachably and positively with the conveyer-belt, the rotary terminal supports for the driving device, and the initial power devices connected to one of the rotary supports of the driving device, substantially as set forth.

19. The combination of the endless conveyer-belt, the rotary terminal supports therefor, the endless driving device, and the rotary terminal supports for the driving device situated outside of the terminal supports of the conveyer-belt and at a greater distance apart than the distance between the terminal supports of the conveyer-belts, substantially as set forth.

20. The combination of the endless conveyer-belt, the endless driving device situated relatively above the conveyer-belt and troughing devices suspended from and sustained by the elevated driving device, and adapted automatically to connect said conveyer-belt to said driving device and to support by suspension the relatively lower conveyer-belt, substantially as described.

21. The combination of the relatively elevated endless driving devices having a forward-moving part and a backward-moving part, the endless conveyer-belt having a forward-moving part and a backward-moving part, and means for detachably connecting together the forward-moving parts of the belt and of the driving device and detachably connecting together the backward-moving parts of the belt and of the driving device, substantially as set forth.

22. In a belt conveyer, the combination with the conveying-belt of an endless moving cable, by which the belt is supported and driven, said cable being arranged in four sections by pairs of sheaves at either end of the system around which it passes, the sheaves at one end of the system being vertical, one of them being adapted to drive the cable, and those at the other end being inclined to the vertical oppositely to one another, whereby the two upper sections of cable are caused to move in one direction and the two lower ones in the opposite direction, and all at a uniform speed, substantially as hereinbefore described and illustrated by Figs. 10 to 15 of the accompanying drawings.

23. In a belt conveyer, wherein the belt is supported and driven by a moving cable or cables, a grip-hook or hanger for suspending the belt from the cable or cables, comprising a plate fixed to the edge of the belt and so bent that while clearing the idlers on which the cable runs, it brings the edge of the belt vertically under the cable, the downturned upper end of said plate forming one inclined jaw of a wedge-shaped mouth, the other somewhat longer jaw of which is formed by the downturned end of a second plate so pivoted to the back of the first plate that downward pressure on the latter causes the jaws to clutch the cable inserted into them and vice versa, substantially as hereinbefore described and illustrated by Figs. 18 and 19 of the accompanying drawings.

24. In a conveyer, the combination of an endless conveyer-belt, terminal supports for the belt, an endless driving device, terminal supports for the said driving device independent of said terminal supports for the belt, and means for detachably connecting the conveyer-belt to the driving device.

25. In a conveyer, the combination of an endless driving device having a forward-moving part and a backward-moving part, an endless conveyer-belt having a forward-moving part and a backward-moving part, and means adapted automatically to connect together the forward-moving part of the belt and of the driving device, and also to automatically connect together the backward-moving part of the belt and of the driving device.

26. A conveyer system comprising an endless driving member, an endless carrying member for material, and means carried by one of said members adapted automatically to connect it to and disconnect it from the other one 27. A conveyer system comprising an endless member, an endless carrying member for material, and means carried by one of said members adapted automatically to grip and then release the other one.

28. A conveyer comprising an endless driving element, an endless-conveyer-belt element, and means carried by either of said elements adapted to automatically connect it to and disconnect it from the other element.

29. A conveyer comprising an endless driving mechanism, an endless belt, and means carried at the edges of said belt adapted to automatically connect it to and disconnect it from said endless driving mechanism.

30. A conveyer comprising an endless driving member, an endless conveying member having runs arranged substantially parallel with and adjacent to the upper and lower runs of said endless driving mechanism, and means carried by one of said members adapted to automatically connect it to and disconnect it from the other of said members.

31. A conveyer comprising an endless driving mechanism, an endless belt having its upper and lower runs arranged substantially parallel with and adjacent to the upper and lower runs of said endless driving mechanism, and means carried by said endless belt adapted to automatically connect it to and disconnect it from said driving mechanism.

32. A conveyer comprising an endless driving mechanism, an endless belt having its upper and lower runs arranged substantially parallel with and adjacent to the upper and lower runs of said endless driving mechanism, and means carried by said endless belt adapted to automatically connect it to and disconnect it from said driving mechanism along both its upper and lower runs.

33. A conveyer comprising an endless-cable driving mechanism, an endless material-carrying belt, and means carried by said belt adapted to automatically grip the cable of said endless driving mechanism.

34. A conveyer comprising an endless driving mechanism, an endless conveyer arranged within the path of travel of said endless driving mechanism, and means carried by the said conveyer for automatically connecting it to and disconnecting it from said endless driving mechanism.

35. A conveyer comprising an endless driving member, an endless conveying member having runs arranged substantially parallel with and adjacent to the upper and lower horizontal runs of said driving member, and means carried by one of said members adapted to automatically connect it to and disconnect it from the other of said members along either its upper or lower horizontal run.

36. A conveyer comprising an endless driving mechanism having upper and lower substantially horizontal runs, an endless carrying mechanism having upper and lower runs adjacent to and parallel with the upper and lower horizontal runs of said endless driving mechanism, and means carried by said endless conveying mechanism adapted automatically to connect it to said endless driving mechanism along its upper horizontal flight and along its lower horizontal run.

37. A conveyer comprising an endless driving mechanism having upper and lower substantially horizontal runs, an endless carrying mechanism having upper and lower runs adjacent to and parallel with the upper and lower horizontal runs of said endless driving mechanism, and grippers carried by said endless carrier adapted automatically to connect it to said endless driving mechanism along both its upper and lower runs, and means for reversing said grippers between the upper and lower runs of said endless carrier to bring them into proper gripping relation with the said endless driving mechanism along both its upper and lower runs.

38. A conveyer comprising an endless driving mechanism having upper and lower substantially horizontal runs, an endless carrying mechanism having upper and lower runs adjacent to and parallel with the upper and lower horizontal runs of said endless driving mechanism, and automatic driving mechanism engaging grippers secured to the edges of said endless belt, and means arranged between the upper and lower runs of said endless belt for troughing it so as to position the said grippers in proper relation with the endless driving mechanism to engage it along both its upper and lower runs.

39. A conveyer comprising an endless material-carrying member, an endless-cable driving mechanism therefor formed of a single piece of cable arranged to have two upper strands each arranged substantially parallel with and adjacent to one edge of the upper horizontal run of said endless carrier, and to have two lower strands, each arranged parallel with and adjacent to one edge of the said endless carrier along its lower horizontal run, and means for guiding and directing the said endless cable along its different paths adapted to cause its upper strands to travel substantially uniformly and in the same direction, and to cause its lower strands to travel substantially uniformly in the opposite direction, and means for connecting said material-carrying member and said cable driving mechanism together.

40. A conveyer comprising an endless material-carrying member, an endless-cable driving mechanism therefor formed of a single piece of cable arranged to have two upper strands, each arranged substantially parallel with and adjacent to one edge of the upper horizontal run of said endless carrier, to have two lower strands, each arranged parallel with and adjacent to one edge of the said endless carrier along its lower horizontal run, and means for guiding and directing the said endless cable along its different paths adapted to cause its upper strands to travel substantially uniformly and in the same direction, and to cause its lower strands to travel substantially uniformly in the opposite direction, and means carried by said endless material-carrying member adapted to detachably connect it to said cable both along its upper and lower strands.

In witness whereof I have hereunto set my hand in presence of two witnesses.

ROBERT MAYO CATLIN.

Witnesses:
HAROLD ERNEST KISCH
ALF. S. EDFROMBE.